Figure 1:
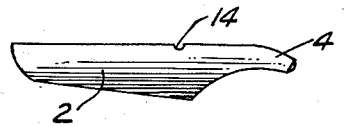

Jan. 11, 1955  K. SCHWEIGER ET AL  2,699,148
BALL PEN POINT
Filed Feb. 20, 1951  2 Sheets-Sheet 1

INVENTOR
KARL SCHWEIGER
JOSEF LEUSER
PAUL MEYER
BY Bailey, Stephens & Huettig
ATTORNEYS Jan. 11, 1955  K. SCHWEIGER ET AL  2,699,148
BALL PEN POINT
Filed Feb. 20, 1951  2 Sheets-Sheet 2
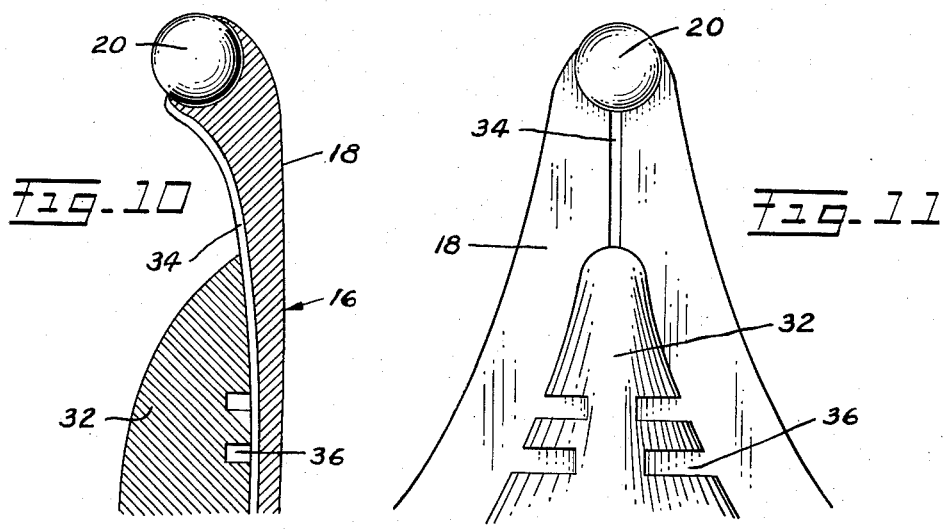
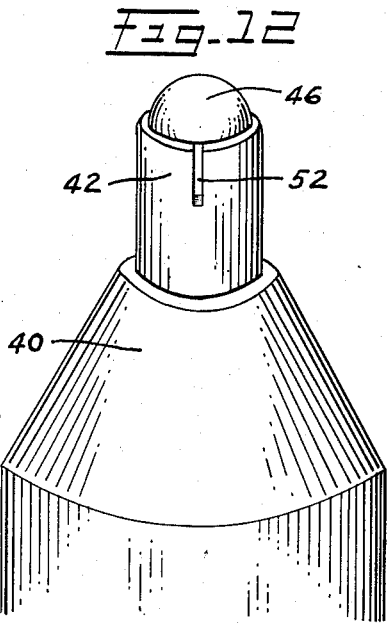
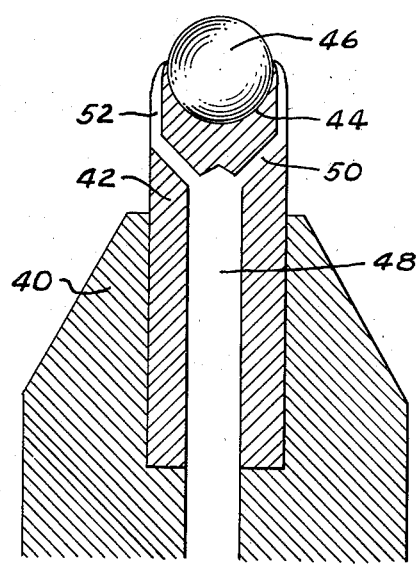
INVENTOR.
KARL SCHWEIGER
JOSEF LEUSER
PAUL MEYER
BY Bailey, Stephens & Huettig
ATTORNEYS

United States Patent Office 2,699,148
Patented Jan. 11, 1955

2,699,148

BALL PEN POINT

Karl Schweiger, Nurnberg, Joseph Leuser, Pforzheim, and Paul Meyer, Dossenheim, Germany, assignors to Deutsche Gold- und Silber-Scheideanstalt vormals Roessler and Gebruder Schweiger, companies of Germany Application February 20, 1951, Serial No. 211,914

Claims priority, application Germany March 3, 1950

4 Claims. (Cl. 120—42.4)

This invention relates to a ball point writing pen. In particular, the invention is directed to a pen point having a new means of setting the ball in the nib socket, and of feeding ink to the ball.

Heretofore, in ball point pen points, the ball has been seated in a spherical socket, the socket being drilled or slit in some manner so as to allow ink to reach the ball inside the socket. This structure practically necessitates the use of plastic or rather viscous lubricating inks in order that the ball would not freeze in the socket. Ordinary inks of the acid type could not be used.

Furthermore, because of the smallness of the socket, a drill hole forming an inlet port for feeding ink into the socket is so large relatively as to materially lessen the bearing area for the ball, thus resulting in a weakened structure subject to great wear and a short life.

The objects of the instant invention are to produce a pen point in which the ball is seated in an uncut or undrilled socket; to produce a pen in which the ball has a bearing engagement with the full inner surface of the socket; to produce a pen in which ordinary ink as well as plastic ink can be used, and to produce a pen which has the flexibility of an ordinary writing pen.

Generally these objects are obtained by constructing the pen point of usual form except that the nib is thickened and provided with a spherical socket at its tip into which a ball is seated. Open grooves extending on the under surface of the pen terminate at the outer edge of the socket, and constitute capillary channels for the passage of ink from the pen to the ball. The pen is otherwise constructed according to the usual forms of ordinary pens, and has the same flexibility as can be obtained in the ordinary pen. The number of ink carrying grooves extending to the outer edge of the socket can be varied according to the amount of ink desired to be delivered to the ball, and the size of the grooves can likewise be constructed in accordance with the type of ink to be used, whether ordinary ink or plastic ink.

The means by which these objects are obtained is more fully described with reference to the accompanying drawings, in which:

Figure 1 is a side elevational view of the pen point constructed according to this invention.

Figure 2:
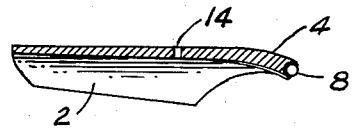
Figure 3:
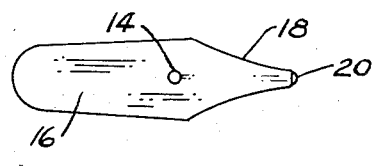
Figure 4:
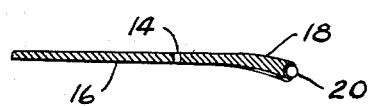
Figure 5:
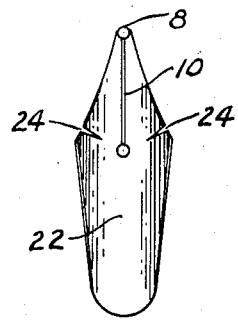
Figure 6:
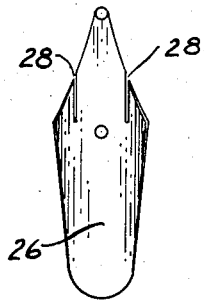
Figure 7:
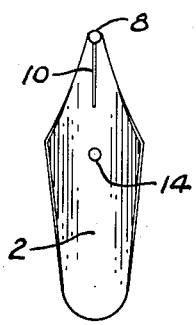
Figure 8:
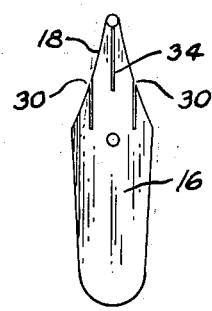
Figure 9:
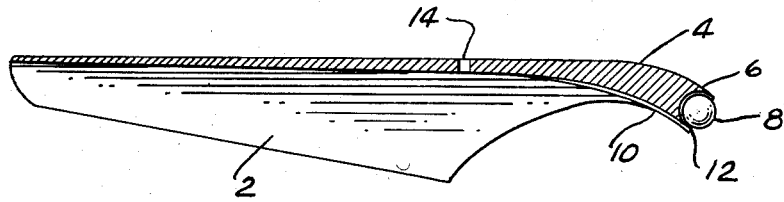

Fig. 2 is a longitudinal sectional view through Fig. 1.
Fig. 3 is a plan view of a modified form of pen point.
Fig. 4 is a longitudinal cross-sectional view through Fig. 3.
Fig. 5 is a bottom view of a modified form of pen point.
Fig. 6 is a top plan view of a further modified pen point.
Fig. 7 is a bottom view of the pen point shown in Fig. 1.
Fig. 8 is a bottom plan view of a modified form of the pen point shown in Fig. 3.
Fig. 9 is an enlarged detailed view of a portion of Fig. 2.
Fig. 10 is an enlarged cross-sectional detailed view of the pen point of Figs. 3 and 4 mounted on a pen.
Fig. 11 is a bottom view of Fig. 10.
Fig. 12 is a perspective view of the invention applied to the conventional ball point pen; and
Fig. 13 is a vertical cross-sectional view through Fig. 12.

In Figs. 1, 2, and 7, the pen point 2 is of an ordinary arcuate cross-sectional form. The nib 4, however, is thickened, and the end point formed with a spherically shaped socket 6, into which a ball 8 is mounted. As best seen in Fig. 9, a groove 10 extends in the undersurface of the pen from the position adjacent the ink supplied from the pen to the outer peripheral edge 12 of socket 6. A plurality of grooves 10 can be employed, and the size of the grooves constructed according to the amount and type of ink being supplied to the ball 8. No drill hole, channel, or other cut is made in the inner surface of socket 6, the full unbroken area constituting a bearing surface for ball 8. The body of pen point 2 is otherwise constructed according to the conventional pen points, and may include the usual air hole 14. Thus, the pen point can be inserted into an ordinary fountain pen using liquid ink.

The pen point 2 maintains the advantage of flexibility inherent in the ordinary pen point. This flexibility can be increased by constructing the pen point as shown in Figs. 3 and 4, in which the pen point 16 has a flat body from which the nib 18 extends at a slight angle, and contains a ball point similar to that shown in Fig. 9. The flat body permits greater flexibility than can be achieved by the arcuate cross-section of Figs. 1 and 2.

However, further flexibility can be obtained in the arcuate cross-sectional pen point by slitting the pen point. In Fig. 5, the pen point 22 is similar to the pen point shown in Figs. 1, 2 and 9, with the addition of transverse slits 24 cut into the sides of the pen point in order to increase the flexibility of the nib. Similarly, the pen point 26 of Fig. 6 is provided with longitudinal slots 28 for increasing the flexibility of the pen point.

In Fig. 8, the pen point of Figs. 3 and 4 is given an increased flexibility by means of the longitudinal slots 30.

In Figs. 10 and 11 an enlarged fragmentary detailed view illustrates the pen point 16 of Figs. 3 and 4 applied to the end of a pen 32. The capillary groove 34 which extends from inkwell 36 in the pen to the outer edge of the socket in which the ball 20 is seated clearly appears. It is apparent that ink is fed from the body of the fountain pen in the customary manner to the tip 32, from which it flows through grooves 34 to the tip ball 20.

In Figs. 12 and 13, the features of the invention are applied to the customary ball point pen construction. Thus, in the end 40 of a conventional ball point pen, a tube 42 is fitted, one end of which contains a socket 44 for holding a ball 46. The tube is drilled to provide access from the center core 48 through passageways 50 to grooves 52, which grooves terminate at the outer edge of socket 44.

By reason of the fact that the socket housing the ball is not drilled or cut in any manner for the supply of ink to the interior of the socket, the ball has a full bearing surface to support it in the socket. The cutting of openings in the sockets of prior constructions was deleterious to the bearing of the ball in the socket inasmuch as the size of any opening in the socket must be relatively large compared to the size of the ball. Accordingly, the instant invention, by reason of providing a full bearing surface for the ball, permits the ball to be used with greater bearing pressures, and insures a freer and more uniform rolling of the ball in the socket. The capillary grooves supplying the ink extend only to the outer peripheral edge of the ball carrying sockets, and supply ink to the ball exteriorly of the socket, thus preserving the structure of the socket.

The pen points can be constructed of any of the usual metals employed for pen points, with the nib socket tempered to provide a good wearing surface for the ball. The balls may be of steel, or any of the other usual materials, including glass, agate, and the like.

The pen point achieves the advantages of a ball point pen with those of the ordinary pen, some of these advantages constituting flexibility of the pen point, as well as the use of pressure to produce carbon copies, and the employment of ordinary ink, which is useful in producing documents which can be identified as to age, or, if desired, plastic ink can be employed.

Having now described the means by which the objects of the invention are obtained, we claim:

1. A pen point comprising a pen point body, a socket having an unbroken surface area in the nib end of said body, a ball seated in said socket and held therein by the outer peripheral edge of said socket, and an ink carrying capillary groove on the surface of said body extending to the outer peripheral edge of said socket, said groove being of insufficient depth to penetrate through said body into said socket, whereby ink is delivered to said ball exteriorly of said socket.

2. A pen point as in claim 1, said body having an upper and a lower surface, and said groove extending along said lower surface.

3. A pen point as in claim 1, said body comprising a tubular member, and a passageway communicating with the interior of said member and to said groove.

4. A pen point as in claim 1, having a ball made of quartz.

References Cited in the file of this patent

UNITED STATES PATENTS

| | | |
|---|---|---|
| 191,154 | Johnson | May 22, 1877 |
| 331,203 | Loeser | Nov. 24, 1885 |
| 1,527,971 | Forsell et al. | Mar. 3, 1925 |
| 2,511,561 | Beumer | June 13, 1950 |
| 2,513,380 | Townsend | July 4, 1950 |
| 2,536,124 | Bolvin | Jan. 2, 1951 |

FOREIGN PATENTS

| | | |
|---|---|---|
| 800,851 | France | May 11, 1936 |
| 622,959 | Great Britain | May 10, 1949 |
| 264,938 | Switzerland | Mar. 16, 1950 |